United States Patent
Spain

[11] 3,966,029
[45] June 29, 1976

[54] TWO PIECE BRAKE DISC

[76] Inventor: Raymond G. Spain, 6572 Segovia Circle, Huntington Beach, Calif. 92647

[22] Filed: Nov. 29, 1974

[21] Appl. No.: 528,383

[52] U.S. Cl. .................. 188/218 XL; 188/251 A; 192/107 M
[51] Int. Cl.² ........................................ F16D 65/12
[58] Field of Search ........ 188/218 XL, 251 A, 73.1, 188/73.2; 192/107 R, 107 M; 156/293, 294

[56] References Cited
UNITED STATES PATENTS

| | | | |
|---|---|---|---|
| 2,907,430 | 10/1959 | Grote | 192/107 R |
| 3,468,737 | 9/1969 | Hildebrandt et al. | 156/293 |
| 3,473,637 | 10/1969 | Rutt | 192/107 R |
| 3,494,452 | 2/1970 | Finkin | 188/218 XL |
| 3,612,614 | 10/1971 | Ware | 156/294 |
| 3,639,197 | 2/1972 | Spain | 192/107 R |
| 3,724,612 | 4/1973 | Spain | 188/218 XL |
| 3,730,320 | 5/1973 | Freeder et al. | 188/218 XL |
| 3,747,712 | 7/1973 | Stout | 192/107 R |

Primary Examiner—Stephen G. Kunin
Assistant Examiner—Edward R. Kazenske
Attorney, Agent, or Firm—Fraser and Bogucki

[57] ABSTRACT

A two piece brake disc includes an outer ring shaped member and an inner ring shaped member disposed concentrically within and joined to the outer member. One of the members comprises a structural member for mounting the disc with the other member comprising a wear member having one or more frictional surfaces and being replaceable because of the two piece construction. The members are essentially all-carbon composites which may differ chemically from one another such as through use of additives in the structural member to increase its oxidation resistance. The all-carbon composites may include carbon fibers with at least some of the fibers in the structural member being longer and circularly oriented to provide portions of the structural member with added strength.

1 Claim, 4 Drawing Figures

TWO PIECE BRAKE DISC

FIELD OF THE INVENTION

The present invention relates to a two piece brake disc with a primarily carbon structural ring member and a secured all-carbon wear element.

BACKGROUND OF THE INVENTION

Composites composed essentially of carbon are receiving increasing attention as materials for aircraft brake discs. Innovations have depicted reinforcement of such composites by laminated carbon cloths and by continuous carbon fibers in a helical pattern about the periphery regions of the brake discs with the remaining portion of the disc containing a substantial amount of carbon fiber in continuous or staple form.

As such discs operate at high temperatures in air, oxidative deterioration at high stress areas of the peripheries has been a serious problem, limiting the usefulness of the discs. While various integral and surface permeating additives are well known to increase the oxidation resistance of carbon bodies, such additives to the complete disc may seriously detract from the desired thermal, frictional and wear characteristics of the disc when in service.

When the non-peripheral areas of discs have worn a specified amount because of friction, the disc is discarded. It would be advantageous for the users of such discs if only the worn portion of the discs could be replaced.

It is therefore a primary objective of this invention to provide a two piece brake disc comprising a modified carbon composite structural ring forming the peripheral non-wearing portion of this disc of improved oxidation resistance and an inner disc wear element of an essentially all-carbon composite comprising both friction surfaces of the disc which may be refurnished when worn.

BRIEF STATEMENT OF THE INVENTION

In accordance with the present invention, a two piece brake disc comprises an oxidation resistant structural ring and a mating wear element.

The structural ring comprises the non-frictional wearing, slotted peripheral portion of the disc which is subjected to high stresses in brake disc operation. Improved oxidation of this portion of the disc is attained by selected surface permeating and/or integral additives. The non-slotted edge of the structural ring is of a continuous cam configuration which insures locking and stress transfer to the mating wear element in brake operation.

The wear element has one circular edge and a second edge of a complimentary configuration to the cam configuration of the structural ring edge. The wear element provides friction surfaces on both flat sides of the element.

In one embodiment, the structural ring and wear element are formed separately and joined at their mating surfaces by a carbonizing cement. In another embodiment, the mating of the two disc components is achieved by initially forming one component with the prior formed other component defining the mating surface. In still another embodiment, means are provided for brake disc refurbishment by replacing only the worn wear element.

DESCRIPTION OF THE DRAWINGS

The features of the present invention are pointed out with particularly in the appended claims. The invention itself together with further objects and advantages thereof, may be best understood with reference to the following description taken in connection with the drawings in which:

DESCRIPTION

Figure 1:
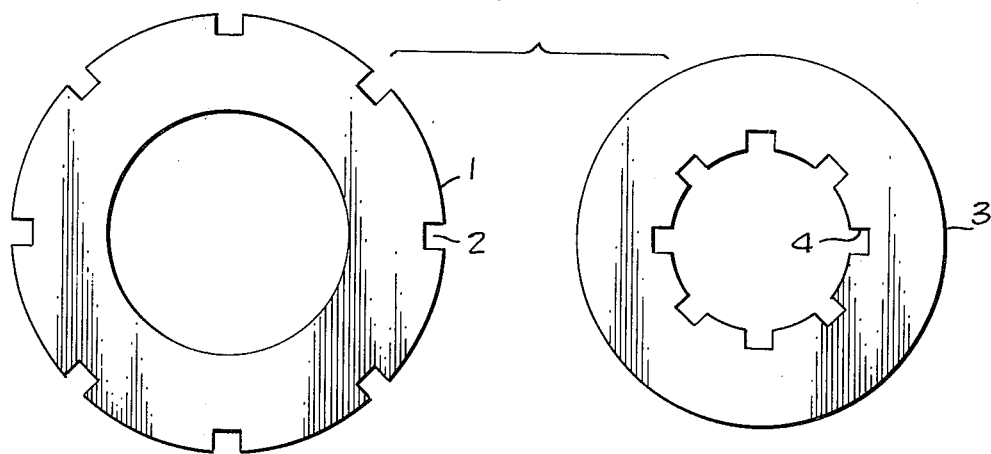
FIG. 1 is a simplified plan view of a typical rotor and stator configuration for carbon composite brake discs.

For purposes of clarity and simplicity, the following descriptive matter discusses the utility of my present invention in terms of a pressure actuated brake assembly with rotors and stators. Aircraft ordinarily employ disc brakes which function like a pedal actuated bicycle brake consisting of a stack of alternating rotors and stators. FIG. 1 illustrates a simplified plan view of a rotor 1 with outer peripheral slots 2, and a stator 3 with inner peripheral slots 4. In operation, the slots 2 of the alternating rotors are splined to the turning aircraft wheel, and the slots 4 of the alternating stators are splined to the stationary axle. Braking is obtained by pressing the alternating rotors and stators together, causing friction in the common frictionally interacting areas of the rotors and stators.

Figure 2:
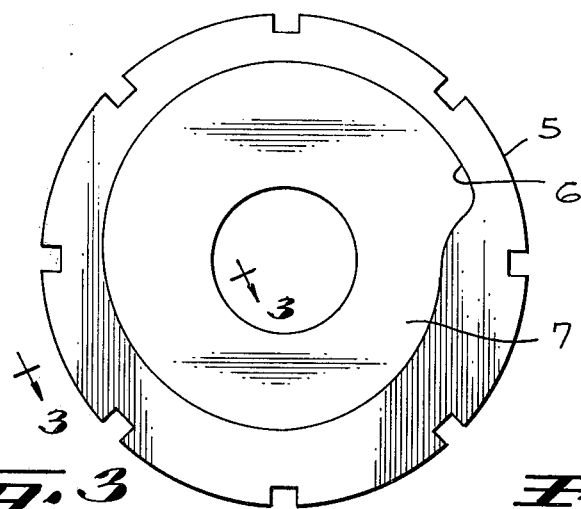
FIG. 2 is a plan view of a rotor disc in accordance with the present invention.

A rotor brake disc depicted in FIG. 2 in accordance with the invention comprises a splined structural ring 5 of a carbon composite structure which may be modified by selected additives to improve oxidation resistance. The inner edge configuration 6 of the ring is primarily that of a spiral of Archimedes. For clarity, the degree of the spiral has been greatly exaggerated, and in practice the major and minor radii of the spiral need differ 1 for example, only by a small fraction of an inch for a disc of 20 inches in major diameter. A wear member 7 has an outer edge mating with and sharing the surface configuration 6 and opposite broad surfaces which are generally continuous with the opposite broad surfaces of the ring 5. Stator disc design (not shown) would employ an inner structural ring, and an outer wear element in accordance with the invention.

Figure 3:
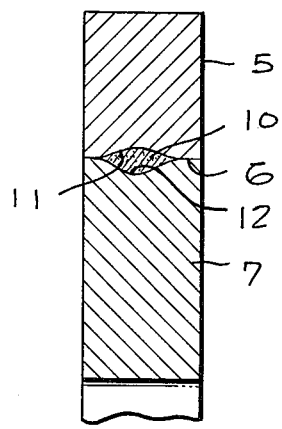
FIG. 3 is a cross-sectional view of the disc of FIG. 2 showing one form of disc mating joint configuration employing a carbonaceous cement.

FIG. 3 is a cross-sectional view illustrating one form of mating joint between the structural ring 5 and the wear element 7. The members 5 and 7 are secured together by carbonaceous cement 10 inserted in thin paste form into a void between the members formed by grooves 11 and 12 in the edges of the members 5 and 7 respectively. The paste is subsequently converted to a rigid mass by heating.

Figure 4:
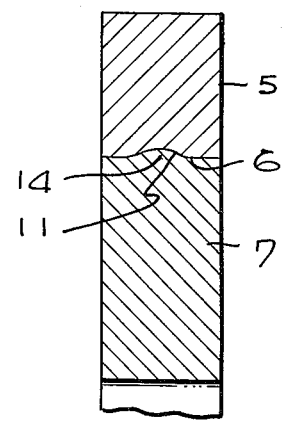
FIG. 4 is a cross-sectional view of the disc of FIG. 2 showing another form of disc mating joining configuration with one member formed to a prior formed member.

In the alternative joining arrangement of FIG. 4 the structural ring 5 is provided with the groove 11 at the inner edge thereof. Upon replacement of the old wear member 7, a new wear member 7 is formed by molding within the ring 5. As so molded the outer edge of the wear member 7 is formed with a tongue 14 residing within and engaging the groove 11.

EXAMPLE

In forming the structural ring member 5, centrifugal preparation of preforms may be employed. The primary reinforcement is staple carbon fiber of about 2 to 4 inches in length which has been impregnated with particulate graphite and a high carbon char yielding resin. Carbon fibers with tensile strengths above 200,000 psi may be employed. Continuous, impregnated carbon fibers may be chopped to the desired staple lengths immediately prior to centrifugal forming. Simultaneously, a premix composition consisting of very short staple carbon fibers of about 0.050 to 0.100 in. lengths, particulate graphite and high char yielding resin are admitted to the rotating centrifugal forming fixture. A convenient average composition for these materials is a weight ratio of long staple fiber: short staple fiber: particulate graphite: resin of approximately 30:5:30:35. Fugative liquids to facilitate preforming are typically in the range of 50 to 100% of that of the solid materials used to prepare the preforms. These fugative liquids may be solvents for the char forming resins, or resin inert diluents if the resins are employed as particulate, dispersed materials. In either case the liquids can be readily removed from the preforms by modest heating at temperatures sufficiently low to prevent premature curing of the resin at normal or reduced pressures.

For compositions employing integral additives to improve oxidation resistance, such additives are used as a partial substitute for the particulate graphite. Examples of such additives are oxides of silicon and boron, and barium and calcium fluorides.

Typical preferred particulate graphites are chemically refined natural graphites with ash contents of 0.2% or less (obtainable from The Asbury Graphite Mills, Inc. of Asbury, New Jersey). To maximize packing efficiency, a blend of graphite particle sizes is preferred, with a preponderance of the graphite below about 3 microns in diameter.

High char yielding resins, for example, are SC-1008 (Monsanto Co., St. Louis, Missouri) which yields about 55% carbon on pyrolysis, and H-Resin (Hercules, Incorporated; Wilmington, Delaware) which yields about 85% carbon on pyrolysis.

After removal of the fugative liquid from the preform, the structural ring is compression molded at resin curing temperatures sufficient to cure the resin employed, and at pressures of about 2000 to 8000 psi.

Pyrolyses temperatures are generally in the range of 1300° to 1800°C.

Porosity of the resulting inorganic composities may be minimized by impregnating the composite with char yielding resins and repyrolyses.

Additives of the surface permeable types may also be added as impregnants prior to pyrolyses to result in improved oxidation resistance. An example of a single active component additive is partially hydolyzed ethyl silicate, yielding silica and/or silicon carbide upon pyrolyses. Successive impregnation of water soluble silicates and water soluble compounds of calcium and magnesium may subsequently yield oxidation resistant glasses on pyrolyses from in situ reactions.

As the preforming materials for the rotor wear elements do not contain long staple carbon fibers, preforming is primarily a matter of compaction and liquid removal prior to compression molding. Further, as the mechanical strength required for the wear element is lower than the structural ring, a smaller amount of total reinforcing fiber is necessary. For example, a weight ratio of short carbon fiber: particulate graphite: resin is on the order of 15:55:30.

For stator elements wherein the wear element is exterior to the structural ring, it is advisable to use long (2 to 4 inch) staple fibers in the periphery of the wear element preform to subsequently form a strong outer reinforced layer to mitigate the possibility of element fragmentation in use. The weight fraction of this long staple fiber may be of the order of 5%.

Molding and pyrolyses conditions for the wear elements 7 are similar to those of the structural rings. No additives to mitigate oxidation are employed.

Securing the disc members at the mating joint to prevent movement normal to the plane of the disc by integral molding of disc members has been previously described. Carbonaceous cements to effect such joints are available commercially in the form of a thin paste which is converted to a thermally resistant solid by heating at elevated temperatures. In the joint design described, it is not necessary for the cements to strongly adhere to the disc members to effect the mechanical joint.

What I claim is:

1. A friction disc for use in a brake assembly comprising an outer, generally ring shaped member having an inner edge, an inner, generally ring shaped member disposed generally concentrically within the outer member and having an outer edge disposed against and generally coextensive with the inner edge of the outer member, each of the outer and inner members being essentially an all-carbon composite, one of the outer and inner members comprising a structural member for the disc and the other one of the outer and inner members comprising a wear member having at least one surface defining a frictional wear surface, and cement of essentially all-carbon composition disposed between and bonding the inner edge of the outer member and the outer edge of the inner member together, the inner edge of the outer member and the outer edge of the inner member each having grooves therein, the grooves forming a void therebetween, and the cement of essentially all-carbon composition being disposed within the void.

* * * * *